(12) United States Patent
Bastide et al.

(10) Patent No.: US 11,093,612 B2
(45) Date of Patent: Aug. 17, 2021

(54) MAINTAINING SYSTEM SECURITY

(71) Applicant: International Business Machines Corporation, Armonk, NY (US)

(72) Inventors: Paul R. Bastide, Ashland, MA (US); Rohit Ranchal, Austin, TX (US); Shakil Manzoor Khan, Highland Mills, NY (US); Senthil Bakthavachalam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/655,372

(22) Filed: Oct. 17, 2019

(65) Prior Publication Data
US 2021/0117542 A1    Apr. 22, 2021

(51) Int. Cl.
*G06F 21/56*    (2013.01)
(52) U.S. Cl.
CPC .......... *G06F 21/565* (2013.01); *G06F 21/568* (2013.01)
(58) Field of Classification Search
CPC ...... G06F 21/56; G06F 21/564; G06F 21/565; G06F 21/568; G06F 21/566; H04L 63/12; H04L 63/14; H04L 63/1425; H04L 63/1416; H04L 63/1433
See application file for complete search history.

(56) References Cited

U.S. PATENT DOCUMENTS

| 8,302,193 | B1* | 10/2012 | Gardner | G06F 21/56 726/24 |
| 8,799,903 | B1* | 8/2014 | Talwar | G06F 9/5094 718/100 |
| 9,235,703 | B2* | 1/2016 | Pagan | G06F 21/562 |
| 9,686,293 | B2 | 6/2017 | Golshan | |
| 10,191,976 | B2 | 1/2019 | Raichelgauz | |
| 2003/0074574 | A1* | 4/2003 | Hursey | G06F 21/564 726/22 |
| 2005/0132206 | A1* | 6/2005 | Palliyil | G06F 21/645 713/188 |
| 2006/0037079 | A1* | 2/2006 | Midgley | G06F 21/56 726/24 |

(Continued)

FOREIGN PATENT DOCUMENTS

| CN | 101119373 B | 2/2008 |
| CN | 103354931 A | 10/2013 |
| CN | 104106094 A | 10/2014 |
| WO | 2005119489 A2 | 12/2005 |

OTHER PUBLICATIONS

"Maintaining System Security", International application No. PCT/IB2020/059628, International filing date Oct. 14, 2020, 25 pages.

(Continued)

*Primary Examiner* — Richard A McCoy
(74) *Attorney, Agent, or Firm* — David K. Mattheis; Maeve. M. Carpenter

(57) ABSTRACT

Maintaining system security by receiving metadata associated with at least a part of one data file from a metadata storage unit, generating a priority for the at least a part of one data file according to the metadata, and conducting a scan of the part of the data file. The metadata includes one or more virus indicators.

18 Claims, 4 Drawing Sheets

(56) References Cited

U.S. PATENT DOCUMENTS

| | | | |
|---|---|---|---|
| 2007/0043857 A1* | 2/2007 | Yao | H04L 63/1441 709/224 |
| 2007/0240217 A1* | 10/2007 | Tuvell | G06F 21/565 726/24 |
| 2007/0244920 A1* | 10/2007 | Palliyil | H04L 67/2819 |
| 2012/0185445 A1 | 7/2012 | Borden | |
| 2014/0337981 A1* | 11/2014 | Wade | G06F 21/50 726/24 |
| 2016/0065595 A1* | 3/2016 | Kim | H04L 29/06877 726/1 |
| 2017/0011079 A1 | 1/2017 | Verma | |
| 2018/0219888 A1 | 8/2018 | Apostolopoulos | |

OTHER PUBLICATIONS

Patent Cooperation Treaty, International Searching Authority, Notification of Transmittal of the International Search Report and the Written Opinion of the International Searching Authority, or the Declaration, dated Jan. 27, 2021(Jan. 27, 2021), International application No. PCT/IB2020/059628, 11 pages.

Badr et al., "Resilient and Trustworthy Dynamic Data-Driven Application Systems (DDDAS) Services for Crisis Management Environments", Procedia Computer Science, vol. 51, 2015, pp. 2623-2637, doi: 10.1016/j.procs.2015.05.370.

Cisco, "Network malware scanner vs IPS", May 28, 2014, Cisco Community, Technology and Support, Security, Intrusion Prevention and Detection Systems (IPS-IDS), retrieved from the Internet Oct. 9, 2019, 5 pages, <https://community.cisco.com/t5/intrusion-prevention-and/network-malware-scanner-vs-ips/td-p/2476742>.

Leitold, Ferenc Dr., "Testing Protections Against Web Threats", 2011 6th International Conference on Malicious and Unwanted Software, pp. 20-26, © 2011 IEEE.

Mell et al., "The NIST Definition of Cloud Computing", Recommendations of the National Institute of Standards and Technology, Special Publication 800-145, Sep. 2011, 7 pages.

Suarez-Tangil et al. "Anomaly-based Exploratory Analysis and Detection of Exploits in Android Mediaserver", IET Information Security 12.5 (2018), 13 pages.

* cited by examiner

MAINTAINING SYSTEM SECURITY

BACKGROUND

The disclosure relates generally to maintaining the data processing system security and the integrity of data in a big data storage system. The disclosure relates particularly to maintaining system security and data integrity by scanning for malicious code and data.

Current multi-tenant systems, such as health care, retail, telecommunications, and financial services systems, may have multiple vendors, customers, and service organizations connected to a single logical data processing system. The logical data processing system may be cloud-based or local and may receive continuous streams of data as well as bulk data batches, accumulating to gigabyte and terabytes of data in a data store.

Incoming data must be scanned for viruses, malware and other malicious data to maintain the security of the system and its users. Existing data must be rescanned as virus definitions are updated as new zero-day exploits are identified. An intrusion prevention system (IPS) is used to monitor incoming data. The IPS may be inline, monitoring live data as it is streamed from external sources to the data lake for storage, or may be out-of-band, processing copies of the data passed to the IPS. Incoming data may also include redundant data which increases the workload of the IPS by requiring scanning of duplicate content.

The scanning activities of the IPS must be carried out without disruption of customer access to the data and without disrupting the continuous streams of incoming data. The streams must be landed in the system without disruption to continue normal operations, reduce ingress/egress costs, reduce or eliminate any waste of system resources, and maintain full access to system services to users and other parts of the system platform.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable prioritizing and scanning data files for malicious code prior to allowing users to access the data.

In one aspect, the invention includes methods, systems and computer readable media associated with maintaining system security by continuously monitoring data files as they are streamed or received in bulk, before the files are processed or otherwise accessed by users. In this aspect, the systems, methods and computer program products proceed by receiving metadata associated with at least a part of one data file from a metadata storage unit, generating a priority for the at least a part of one data file according to the metadata, and conducting a scan of the part of the data file. The metadata includes one or more virus indicators. Once received, the data is provided to users without disruption.

In one aspect, the invention includes methods, systems and computer readable media associated with maintaining system security as virus definitions change over time. In this aspect, the systems, methods and computer program products proceed by receiving an updated virus definition, obtaining metadata associated with at least one data file from a metadata storage unit, generating a priority for the at least one data file according to the metadata and updated virus definition, selecting a data file according to the generated priority, conducting a scan of the data file, updating the metadata of the data file according to the scan, and providing the data file for further processing.

In one aspect, the invention includes methods, systems and computer readable media associated with maintaining system security including the additional advantage of providing a user, or automated receiving system, the common vulnerability and exposures scoring for each scanned file. The user or receiving system then determines if the scanned file should be loaded into a data processing system for further processing and use. The inventions of this aspect proceed by obtaining metadata associated with at least one data file from a metadata storage unit, generating a priority for the at least one data file according to the metadata, selecting a data file according to the priority, conducting a scan of the data file, determining a common vulnerabilities and exposures score for the data file, updating the metadata of the data file according to the scan, and providing the score to a system user for evaluation.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
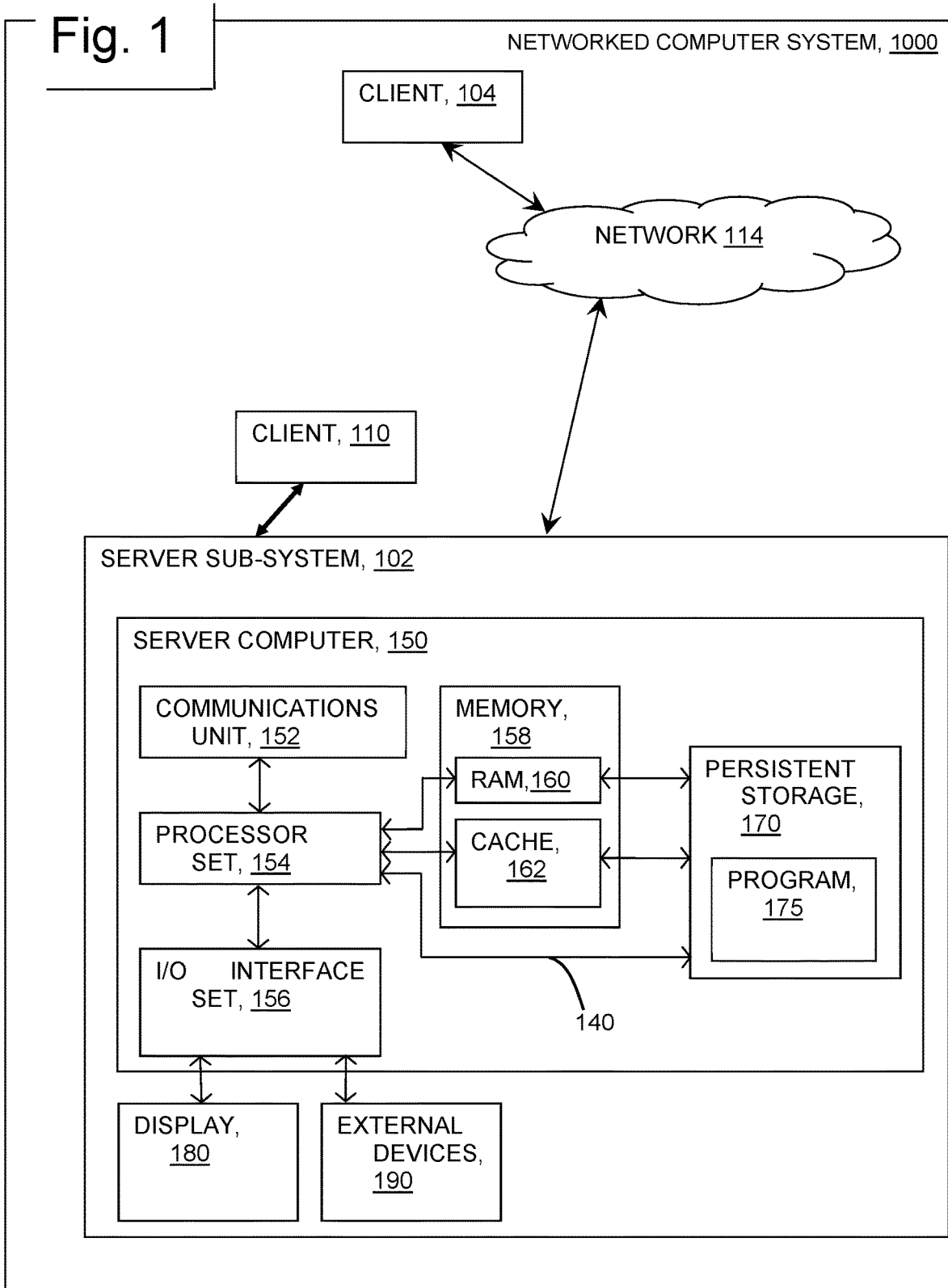
FIG. 1 provides a schematic illustration of a system, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., prioritizing data files according to metadata and scanning prioritized files, etc.). These solutions are not abstract and cannot be performed as a set of mental acts by a human due to the processing capabilities needed to facilitate code scanning and remediation, for example. Further, some of the processes performed may be performed by a specialized computer for carrying out defined tasks related to memory operations. For example, a specialized computer can be employed to carry out tasks related to code scanning and remediation or the like.

Distributed big data processing systems face unique system security issues. These systems receive and distribute very large data files, measured in gigabytes and terabytes. The received data originates from a host of sources, some more reliable than others, and some of which may not check or ensure that the provided data is free of viruses, malware, and other embedded issues with data. System users require uninterrupted access to system data across a distributed environment, where stopping services or data access to review or remediate data issues is not a workable option. System users may download blocks of data for further processing and use. An indication of the security profile of the data assists users in determining which blocks are safe to add to a data processing system for use. Such systems may also receive duplicate files from a single source or from multiple sources. Processing duplicate records for security issues wastes scarce system resources.

In an embodiment, the system includes a data store for storage of large (gigabyte and terabyte sized) files. The system also includes a metadata storage unit which holds one or more metadata tables. The metadata storage unit may be local, or cloud based. The tables include metadata records for the large files held in the data store. In this embodiment, the tables hold metadata fields including some or all of: data relating to file identification, file processing status—is the file available for downstream uses etc., file processed time—a record of the last time the data was processed by the method, a common vulnerabilities and exposures (CVE) score for the file, viruses identified within the file, detailed virus description data, file format information, and data relating to any downstream processing needs of the file. Different file formats are more closely correlated with data borne issues. Files associated with downstream processing, as opposed to long term storage, require more immediate attention and scanning.

The disclosed inventions are applicable to single or multiple application systems fixedly deployed on a single server or distributed across multiple cloud tenancies. The inventions are applicable to near real time data processing of streaming data as well as batch and bulk data processing.

In some embodiments, the metadata also includes checksum data associated with the data files. For bulk or batch data files received out-of-band, the method computes a checksum, such as the hash value (SHA256), for the file. Even minor changes to the file will result in a different checksum value, indicating that the file has been altered. The checksum is stored as metadata associated with the file. In some embodiments, the file may be provided with a checksum value. In these embodiments, the method compares the calculated checksum with the provided value to determine if changes have been made to the file. The checksum may use a checksum technique such as SHA256, MD5, or any other method of calculating a checksum using the data file byte representation.

In an embodiment, the method calculates checksum values for streamlining data files as well as bulk files received out-of-band. For streaming data, the method continuously calculates checksum values in parallel to the streaming data landing in the data store of the system. The method stores the checksum values calculated during streaming as metadata in a lookup table. After the data file has completely landed, the final checksum value for the file is stored in the metadata storage unit in association with the streamed file. In an embodiment, the method subdivides the data file into parts as blocks or segments of the file. In this embodiment, the method computes a checksum for each part of the data file. As each part is completely received, the checksum for each part of the data file is stored as metadata associated with that part of the file. In an embodiment, the parts overlap to ensure that viruses are not split between adjacent blocks and overlooked. Segments can be padded such that each segment includes a portion of the previous segment, for example, each 100-megabyte segment can be padded to include the last 100 kilobytes of the previous segment. In one embodiment, 100-megabyte segments are padded+/−500 kilobytes, to ensure that there are no gaps in the segment scanning due to segmenting the data file. In this embodiment, the segments would range from 0-1.5 MB, 1-2.5 MB, 2-3.5 MB . . . thereby reducing the likelihood that a portion of malicious code would evade detection by being split between two adjacent segments.

In an embodiment, the method compares the checksum values with stored metadata values associated with existing data files and segments. The comparison identifies duplicates of the current batch or streaming file/segment. The method compares continuously calculated checksums as files are streamed to the data store, identifying potentially similar or identical files. In this embodiment, the method uses the final checksum to validate any potentially identical files as actually identical.

In an embodiment, in response to matching a checksum in the metadata, the method triggers a cleansing routine for the file or file segment based upon the CVE score and virus details of the matched file/segment. In this embodiment, the matched metadata is associated with a file having known viruses. In this embodiment, the method cleans the file or segment and updates the metadata indicating that the cleaning has occurred. Cleaning the files can include removing known malicious code portions associated with a detected virus from the file, or restoring the file using a backup copy of the file. The cleaned file is added to list for prioritization. In this embodiment, the method calculates a new checksum for the cleaned file and adds the new checksum to the metadata.

In an embodiment, the method checks the metadata storage unit to determine if new data store batch files have been loaded, or to determine if new streaming data files are loading. In this embodiment, the method checks the metadata associated with any new files. The method then continuously monitors the metadata storage unit for indications of new data files. In an embodiment, the method and systems of the invention rest when no new files or virus definitions are detected.

In an embodiment, the method obtains the metadata for any recently loaded or currently streaming files. The method generates a prioritized listing of new data files using the metadata. The files are prioritized in view of virus indicators, or the likelihood of a file having malware. The method correlates the metadata of all new files to generate the prioritized list. The method considers checksum values relative to previously scanned files in terms of previously found viruses. The method also considers the virus definition used in any previous scan of a file or duplicate, and whether the virus definition is up to date. Scans made using now out of date virus definition scans rate a higher priority for a new scan. Data files needing downstream processing rate a higher priority than files lacking such needs. Files having a checksum deviation compared to either a provided checksum, or a previous scan checksum, rate a higher priority for a new scan. In this embodiment, the method considers the metadata of the set of new and existing files in view of any changes to the virus definitions. The method ranks the set of data files and prioritizes the files from highest (most in need of a scan) to lowest, (least in need of a scan). In this embodiment, the method reviews new unprocessed files—those with no matching file identification or file checksum, rates these files as high priority and creates a new metadata listing in the metadata storage unit for the files. The method also blocks user access to unprocessed files at least until after scanning has been completed for the files. In this embodiment, the method considers duplicate files having the same file identification and file checksum as an existing file, as low priority.

In an embodiment, the method selects a file from the generated prioritized list and scans the file for viruses, malware and other data borne issues. In this embodiment, the method selects the data file according to its priority, beginning with the highest priority. Each file of the list is scanned in turn according to descending priority. In this embodiment, the method selects the highest priority file on the listing. Files are added to the list together with their priority such that a new, high priority file may be scanned before an older file having a low priority.

In an embodiment, the method scans the files for viruses utilizing the detailed current virus definitions. In this embodiment, the method determines a CVE score for each file as well as a listing of viruses found for each file. The time of the scan, virus definition used, viruses found, number of viruses found, file checksum, file format and downstream processing needs associated with the file are all updated as the metadata for the file in the metadata storage unit.

In an embodiment, files are subdivided into blocks or segments to facilitate faster scanning and to optimize file storage. In this embodiment, the method determines and stores metadata for each segment as well as the overall file. In this embodiment, the method includes related segment data as part of the metadata. Scanning one segment of a group of related segments triggers scans of the nearby related segments. In this embodiment, the scans of related segments overlap, increasing the likelihood of finding viruses and malware. In this embodiment, the file may be divided, stored and scanned as a series of logically related segments—segment0, segment1, segment2, etc. In an embodiment, the method scans binary versions of files. In this embodiment, the method maintains the files as binary until after the scan is complete and the file is suitable for downstream processing and user access as part of the available data store. In this embodiment, the method employs an extract—transform—load, or other data processing agent operation to retrieve the data from the file for use as part of the data store.

In an embodiment, the method evaluates the metadata after scanning a file or segment of a file. The method then provides the file for downstream processing, provides the file for a virus/malware cleansing routine, or quarantines the file when cleansing routines are unavailable. In an embodiment, the method provides users access to the CVE score of each file. In this embodiment, the user determines a level of acceptable risk associated with CVE scores and establishes a CVE score threshold. Files having a CVE score below the threshold are accepted into the data processing system of the user for use by data consumers. Those with scores above the threshold are refused. In an embodiment, the method uploads files with no viruses found, or with acceptably low CVE scores for downstream use. The method updates the metadata in the metadata storage unit for all scanned files.

As an example:
A Client application connects with a method Platform using Transport Layer Security Mutual Authentication.
The Client application starts the upload of healthcare data.
The Client has not declared the size of the contents, and the platform maximum support is for multiple terabyte files.
The Platform streams the data into the data store and starts the checksum using SHA256.
The Platform has not yet marked the data ready for download and the downstream consumers are not yet able to consume the new data.
The Platform starts building a checksum for the parts of the file. {Part1: 0-1M, Part 2: 1-2M, Part 3: 2-3M}
The Client application finishes uploading the file.
The Platform updates the Checksum-01234567A in the metadata support column along with the calculated checksums for parts of files.
Running in parallel, the Platform's virus scanning service checks the metadata column.
The metadata contains the following information for the uploaded file:

| FILE ID | 1-2-1-1 |
| PROCESSED | N |
| Checksum | 01234567A |
| PROCESSED TIME | NULL |
| CVE Score | NULL |
| Virus and Virus Details | NULL |
| Related Segments (Prior/Next) | NULL |

A method coordinator checks to see if the checksum already exists, if it exists, the invention prioritizes the ones that have no relevant or similar checksums.
The coordinator, not finding any relevant checksums, extracts the file based on the time.
The coordinator scans the file, and pulls back the results—virus found, virus metadata, and marks the file as processed, with virus content and CVE score.

| FILE ID | 1-2-1-1 |
| PROCESSED | N |
| Checksum | 01234567A |
| PROCESSED TIME | 2019-02-01 07:56:00AM UTC |
| CVE Score | CVSS v2.0 Severity and Metrics: Base Score: 5.0 MEDIUM Vector: (AV:N/AC:L/Au:N/C:N/I:P/A:N) (V2 legend) Impact Subscore: 2.9 Exploitability Subscore: 10.0 |
| Virus Score and Content | Eicar |
| Related Segments (Prior/Next) | None |

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise virus scanning program clients (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the virus scanning program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., virus scanning program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
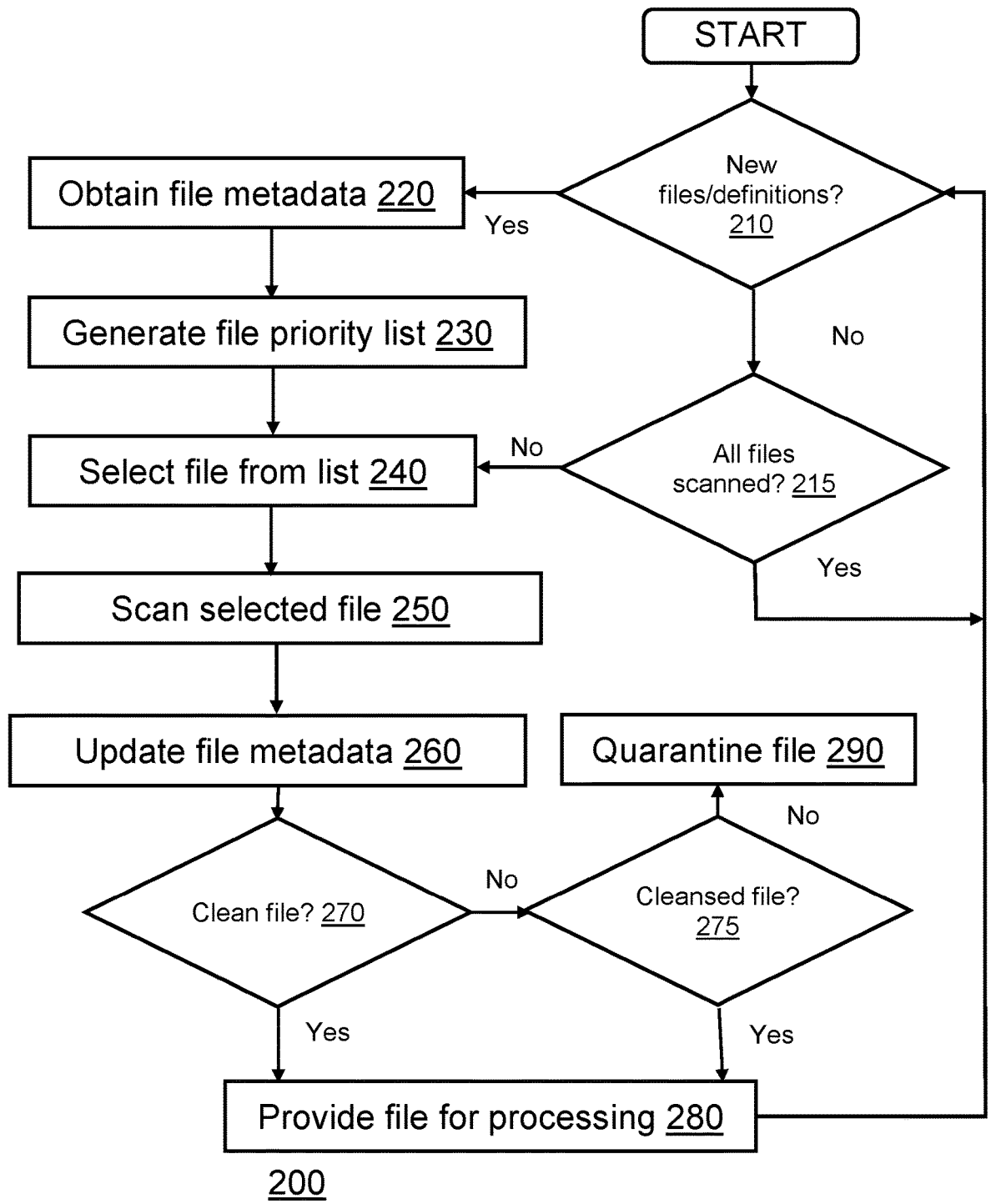
FIG. 2 provides a flowchart depicting an operational sequence, according to an embodiment of the invention.

FIG. 2 provides a flowchart 200, illustrating exemplary activities associated with the practice of the disclosure. After program start, at 210 the method of program 175, checks for new batch or streaming files and/or new virus definitions. Batch files may already be present in the data store and streaming files may be landing in the data store. New virus definitions may be provided to a system Intrusion Prevention System by network communications unit 152. At 220, the method checks for new file metadata in a metadata storage unit of persistent memory 170, a system storage area network or other system memory. For new files without stored metadata, the method of the program 175 creates a new metadata record and begins gathering file metadata. The metadata is gathered from the file itself as well as from method activities associated with the file. For new virus definitions, the method checks for files not yet scanned with the new virus definitions.

At 230, the method of program 175 generates a prioritized listing of all new files according to their need for virus scanning. The method determines file priority using one or more of calculated file checksum values, and a virus correlation indicator from the new files metadata. Higher priorities are assigned to file with a higher urgency for scanning. (Files needing downstream processing access, files with no historical metadata, files with checksum issues, etc.).

At 240, the method of program 175 selects the highest priority data file part from the generated list for scanning. At 250, the method scans the file using the current virus definitions. At 260, the method updates the file's metadata including the time and date of the scan, the virus definitions used, the number, and the details of any viruses found, the new CVE score for the file, any related segment information, etc. At 270, the method marks the file as clean from known virus at the time of scan. In this embodiment, the method provides the CVE score to downstream data consumers, data users and administrators. The recipients of the CVE score determine if the file is sufficiently clean to make available for consumers.

The method passes files containing viruses to file cleansing processes. At 275, the method determines if the file has been cleansed by the process. Clean files are passed to step 280. Virus containing files which have not been cleansed are passed to step 290 and are quarantined from data consumer use, and from being added to data consumer access.

At 280, clean files are added to the data store as usable for data consumers. After step 280, the method returns to step 210 to check for new files/virus definitions. When no new files or definitions are found, the method passes to step 215 and determines if all files on the generated priority list have been scanned with the current virus definitions. The method returns to step 240 and selects the next prioritized file when all files have not yet been scanned. When all files have been scanned, the method returns to step 210 and continues to check for new files and virus definitions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
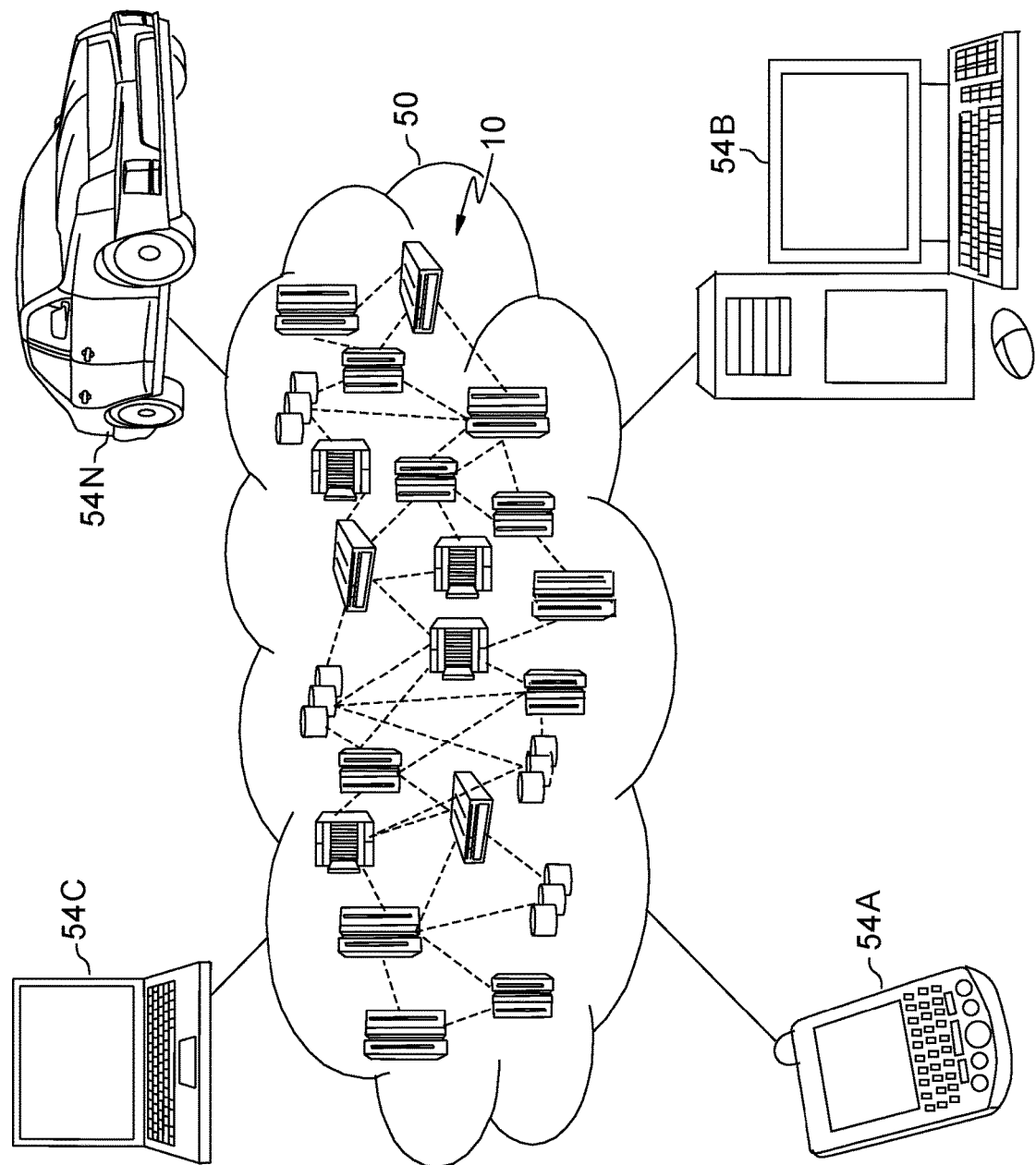
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
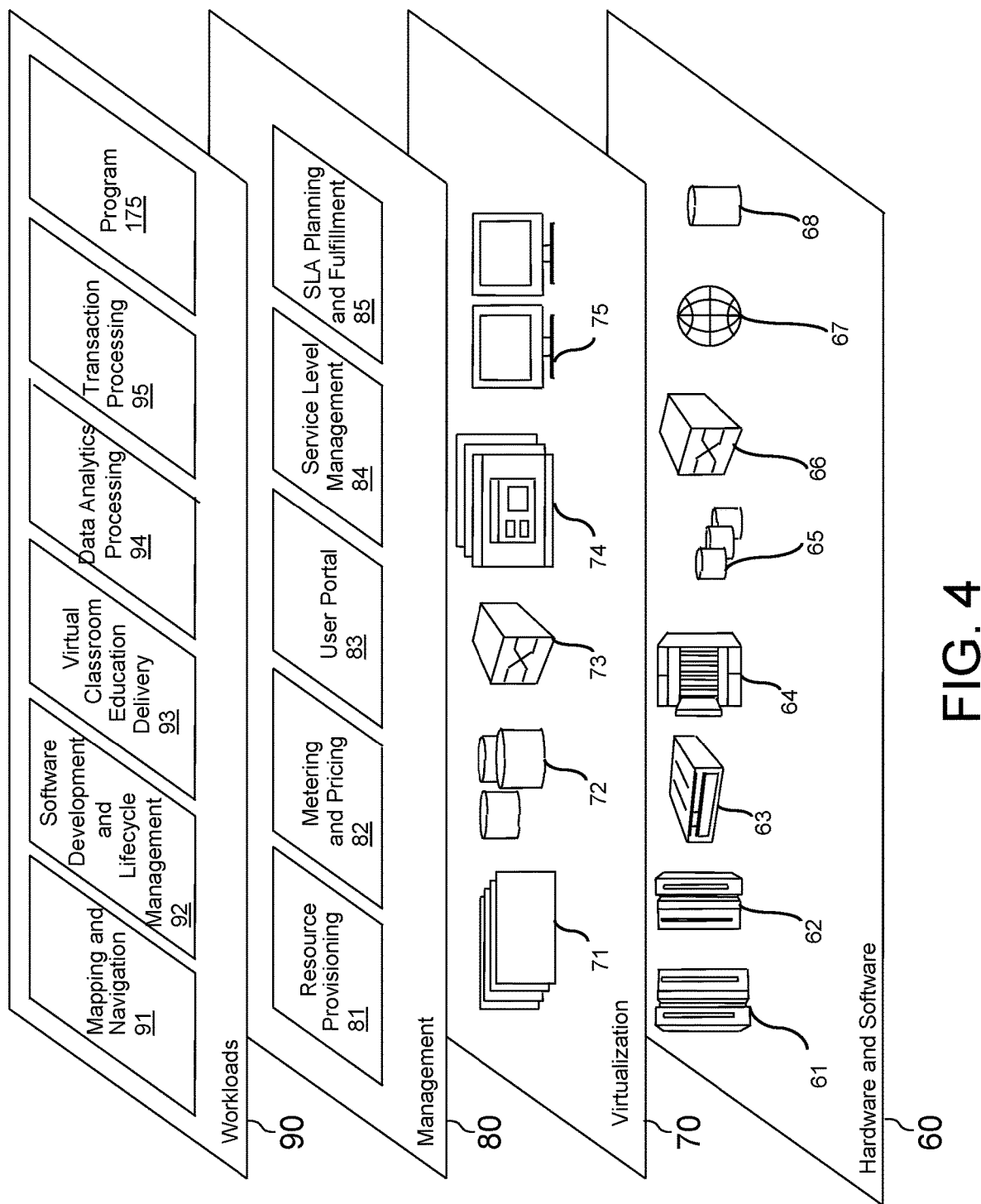
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virus scanning program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for maintaining data processing system security, the method implemented by one or more computer processors comprising:

receiving a plurality of streams, each corresponding to a respective data file, into a data store;
for each of the corresponding respective data files:
calculating a respective checksum using at least part of a corresponding respective stream of the plurality of streams,
selecting respective corresponding metadata from a metadata storage unit by matching the respective calculated checksum with a checksum stored in correspondence with the metadata, and
retrieving respective one or more virus indicators from the selected respective corresponding metadata;
generating a prioritized list including the each corresponding respective data files by rating the priority of the each corresponding respective data files in order of a respective likelihood, determined by the respective one or more retrieved virus indicators, that the each of the data files contains malware;
metadata;
conducting as can of a first data file having a highest priority in the prioritized list before conducting a scan of another data file in the prioritized list;
after the conducting, receiving a new stream corresponding to a new data file;
retrieving new one or more virus indicators corresponding to the new data file from newly selected corresponding metadata from the metadata storage unit;
re-generating the prioritized list, including the each corresponding respective data file that have not been scanned and the new data file, by rating the priority of the each corresponding respective data files that have not been scanned and the new data file in order of a respective likelihood, determined by the respective one or more retrieved virus indicator and the new one or more virus indicators, that the each of the data files and the new data file contains malware;
scanning each file in the regenerated prioritized list in order, beginning with the highest prioritized file in the re-generated prioritized list; and
blocking user access to each file in the re-generated prioritized list until after the each file is scanned.

2. The computer implemented method according to claim 1, wherein each respective checksum is continuously calculated in parallel as each corresponding respective data file streams into the data store.

3. The computer implemented method according to claim 1, further comprising: updating, by the one or more computer processors, each respective corresponding metadata of each respective corresponding data file according to the scan of the each respective corresponding data file; and providing, by the one or more computer processors, each respective corresponding data file for further processing.

4. The computer implemented method according to claim 1, wherein the prioritised list is generated according to a correlation.

5. The computer implemented method according to claim 1, further comprising presenting, by the one or more computer processors, at least one of the respective data files to a cleansing routine.

6. The computer implemented method according to claim 1, further comprising updating, by the one or more computer processors, one of the checksums stored in correspondence with the metadata.

7. A computer program product for maintaining system security, the computer program product comprising one or more computer readable storage devices including non-transitory computer readable memory including stored program instructions thereon, the stored program instructions, when executed, causing the execution of steps comprising:
    receiving a plurality of streams, each corresponding to a respective data file, into a data store;
    for each of the corresponding respective data files;
        calculating a respective checksum using at least part of a corresponding respective stream of the plurality of streams,
        selecting respective corresponding metadata from a metadata storage unit by matching the respective calculated checksum with a checksum stored in correspondence with the metadata, and
        retrieving respective one or more virus indicators from the selected respective corresponding metadata;
    generating a prioritized list including the each corresponding respective data files by rating the priority of the each corresponding respective data files in order of a respective likelihood, determined by the respective one or more retrieved virus indicators, that the each of the data files contains malware;
    conducting a scan of a first data file having a highest priority in the prioritized list before conducting a scan of another data file in the prioritized list;
    after the conducting, receiving a new stream corresponding to a new data file;
    retrieving new one or more virus indicators corresponding to the new data file from newly selected corresponding metadata from the metadata storage unit;
    re-generating the prioritized list, including the each corresponding respective data files that have not been scanned and the new data file, by rating the priority of the each corresponding respective data files that have not been scanned and the new data file in order of a respective likelihood, determined by the respective one or more retrieved virus indicators and the new one or more virus indicators, that the each of the data files and the new data file contains malware;
    scanning each file in the re-generated prioritized list in order, beginning with the highest prioritized file in the re-generated prioritized list; and
    blocking user access to each file in the re-generated prioritized list until after the each file is scanned.

8. The computer program product according to claim 7, wherein each respective checksum is continuously calculated in parallel as each corresponding respective data file streams into the data store.

9. The computer program product according to claim 7, further comprising: program instructions to update each respective corresponding metadata of each respective corresponding data file according to the scan of the each respective corresponding data file; and provide each respective corresponding data file for further processing.

10. The computer program product according to claim 7, wherein the prioritized list is generated according to a correlation.

11. The computer program product according to claim 7, further comprising program instructions to present at least one of the respective data files to a cleansing routine.

12. The computer program product according to claim 7, further comprising program instructions to update one of the checksums stored in correspondence with the metadata.

13. A computer system for maintaining system security, the computer system comprising: one or mare computer processors; and one or more computer readable storage devices including non-transitory computer readable memory including, stored program instructions thereon for execution by the one or more computer processors, the stored program instructions comprising program instructions to:
    receive a plurality of streams, each corresponding to a respective data file, into a data store;
    for each of the corresponding respective data files;
        calculate a respective checksum using at least part of a corresponding respective stream of the plurality pf streams,
        select respective corresponding metadata from a metadata storage unit by matching the respective calculated checksum with a checksum stored in correspondence with the metadata, and
        retrieve respective one or more virus indicators from the selected respective corresponding metadata;
    generate a prioritized list including the each corresponding respective data files by rating the priority of the each corresponding respective data files in order of a respective likelihood, determined by the respective one or more retrieved virus indicators, that the each of the data files contains malware;
    conduct a scan of a first data file having a highest priority in the prioritized list before conducting a scan of another data file in the prioritized list;
    after the conducting, receive a new stream corresponding to a new data file;
    retrieve new one more virus indicators corresponding to the new data file from newly selected corresponding metadata from the metadata storage unit;
    re-generate the prioritized list, including the each corresponding respective data files that have not been scanned and the new data file, by rating the priority of the each corresponding respective data files that have not been scanned and the new data file in order of a respective likelihood, determined by the respective one or more retrieved virus indicators and the new one or more virus indicate, that the each of the data files and the new data file contains malware;
    scan each file in the re-generated prioritized list in order, beginning with the highest prioritized file in the re-generated prioritized list; and
    block user access to each file in the re-generated prioritized list until after the each file is scanned.

14. The computer system according to claim 13, wherein each respective checksum is continuously calculated in parallel as each corresponding respective data file streams into the data store.

15. The computer system according to claim 13, further comprising: program instructions to update each respective corresponding metadata of each respective corresponding data file according to the scan of the each respective corresponding data file; and provide each respective corresponding data file for further processing.

16. The computer system according to claim 13, wherein the prioritized list is generated according to a correlation.

17. The computer system acceding to claim 13, further comprising program instructions to present at least one of the respective data files to a cleansing routine.

18. The compute system according to claim 13, further comprising program instructions to update one of the checksums stored in correspondence with the metadata.

* * * * *